June 10, 1941.  G. L. GARVIN  2,245,471
FRICTION CLUTCH FOR LATHE APRONS
Filed May 10, 1940
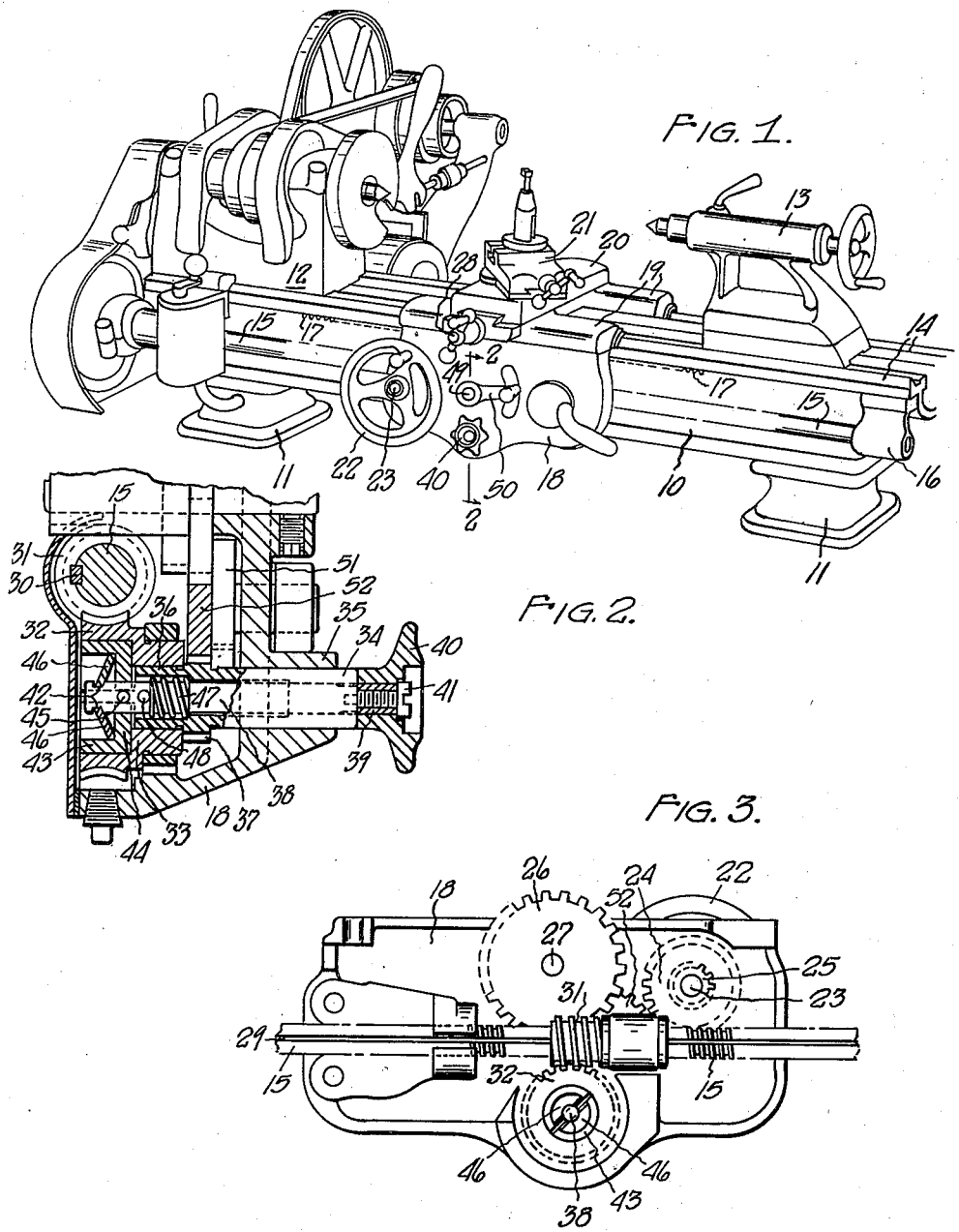
INVENTOR.
GEORGE L. GARVIN.
BY Olrich & Knoblock
Attorneys.

Patented June 10, 1941

2,245,471

UNITED STATES PATENT OFFICE 2,245,471

FRICTION CLUTCH FOR LATHE APRONS

George L. Garvin, South Bend, Ind., assignor to South Bend Lathe Works, South Bend, Ind., a corporation of Indiana Application May 10, 1940, Serial No. 334,316

14 Claims. (Cl. 192—20)

This invention relates to improvements in friction clutches for lathe aprons, and more particularly to a clutch on the lathe apron which is intended to establish a driving connection between two parts of a gear train which are normally free for relative movements. The gear train is driven by the lead screw of the lathe, and is selectively engageable by suitable gear shifting means with gearing associated respectively with a longitudinal rack on the lathe bed, and with a cross feed shaft controlling the position of a tool carrier transversely of the lathe bed. The gear shifting means requires the use of a clutch for releasing the gearing from driving engagement for its operation.

The primary object of the invention is to provide a compact, powerful, simple and substantially wearproof clutch of this character.

A further object is to provide a device of this character with an idler gear having a hollow portion and normally freely rotatable on a member constituting another part of a gear train, and a friction clutch including a toggle acting upon a sectional shoe fitting within the hollow portion of the idler gear for the purpose of selectively establishing a driving connection between the idler gear and the remainder of the gear train.

A further object is to provide a friction clutch comprising toggle members fitting within a sectional shoe, and means for tilting said toggle members, whereby a slight movement of said toggle members effects expansion of said shoe with great force and power.

A further object is to provide a device of this character which will not stick, and which may be positively and instantly actuated to desired position.

A further object is to provide a device of this character having a longitudinally shiftable actuating shaft engaging a pair of toggle members, with said shaft loose in its mounting to permit equalization of the force exerted by the operating toggle members.

A further object is to provide a device of this character having a pair of plate segments fitting within a hollow two-piece clutch shoe with their inner ends received in a notch in a longitudinally shiftable actuating shaft.

Other objects will be apparent from the description and appended claims.

In the drawing:

Fig. 1 is a perspective view of a lathe incorporating my improved friction clutch.

Fig. 2 is an enlarged fragmentary sectional view taken on line 2—2 of Fig. 3.

Fig. 3 is an inner face view of the lathe apron illustrating the relation of the various gears and the clutch to the lead screw.

Referring to the drawing which illustrates the preferred embodiment of the invention as applied to a bench lathe, the numeral 10 designates a lathe bed mounted upon pedestals or supports 11 and mounting a head stock 12 and a tail stock 13. The lathe bed is provided with a pair of ways 14 at its upper end upon which the head stock and tail stock are mounted. A longitudinally extending lead screw 15 is positioned at the front of the lathe bed intermediate the height thereof, being journaled in suitable bearings, such as bearing 16. The lead screw 15 is connected with gearing of any suitable character for establishing a driving connection between the same and the head stock 12. A rack 17 is also carried by the front of the lathe bed just beneath the front way 14, and extends between the head stock 12 and tail stock 13.

A suitable lathe apron 18 depends from shoes 19 slidable upon the ways 14 and has a transversely adjustable member 20 keyed thereto and supporting the usual tool carrier 21.

The lathe apron 18 mounts a hand wheel 22 on a shaft 23. Within the lathe apron the shaft 23 mounts a large gear 24 and a smaller wide gear 25. Gear 25 meshes with the rack 17, whereby rotation of the shaft 23 serves to longitudinally shift the apron 18 along the lathe bed. The apron also mounts a large gear 26 on a shaft 27 spaced from gear 24. Gear 26 extends into meshing engagement with a suitable gear (not shown) mounted upon a transverse feed screw 28 adapted to adjust the position of the member 20 and tool carrier 21 transversely of the lathe bed and the apron. The gear 26 is positioned out of alignment with the gear 24 and has mounted thereon a suitable pinion gear (not shown) positioned in the same plane as gear 24.

The lead screw 15 is provided with a longitudinal spline groove 29, and keyed thereto at 30 is a worm 31 positioned rearwardly of apron 18. A worm gear 32 meshes with worm 31 and has a hub 33 journaled upon a tubular member 34 which is in turn journaled in the apron at 35. Tubular member 34 extends transversely of the apron with its inner end portion 36, which journals hub 33 of gear 32, terminating in outwardly spaced relation to the gear 32. The portion of gear 32 projecting from hub 33 has an enlarged interior bore. A gear 37 is formed integrally with the tubular member 34, and the outer edge of hub 33 bears against said gear 37.

A shaft 38 is loosely mounted within the bore of tubular member 34, and has its outer end portion 39 threaded to receive a hand piece 40 whose threaded adjustment upon shaft 38 is limited by the head of a set screw 41 which is threaded axially of the shaft 38. The inner end of shaft 38 projects from the tubular member and is notched at 42 adjacent its end. Two or more longitudinally divided segments of substantially cup shaped form, and comprising an annular portion 43 and a flange base portion 44, fit within the enlarged bore of gear 32. As here shown, two of such elements are provided, and a pin 45 carried by the shaft 38 and projecting transversely therefrom fits between the adjacent ends of the cup segments. A pair of toggle plates 46, preferably constituting segments of a disk, are mounted within the cup with their inner edges seating in the notches 42 and their outer curved edges seating at the interior of the cup sections at the junction of the annular wall 43 and base flange 44 thereof. The bore of tubular member 34 is enlarged adjacent its inner end to receive a coil spring 47 which bears upon a pin 48 carried by shaft 38.

Apron 18 journals a shaft 49 which carries a handle 50 at its outer end. The inner end of the shaft 49 mounts a cam plate 51 carrying a gear 52 meshing with gear 37. This gear is in the same plane as gear 24 and the pinion (not shown) of gear 26. Cam plate 51 is so formed that as the lever 50 is swung from the intermediate or neutral position shown to its upper or lower limit, the gear 52 is caused to travel in a path of movement concentric with shaft 38. Gear 52 is thus always in mesh with gear 37 on tubular member 34. At one extreme of movement of gears 52, the same will mesh with gear 24 and at its other extreme of movement, gear 52 will mesh with the pinion of gear 26.

The operation of the device is as follows: Assuming that the lever 50 on shaft 49 is at intermediate position as illustrated in Fig. 1, the gear 52 will be held in an intermediate position out of engagement with both gear 24 and the pinion of gear 26, and the apron gearing will be in neutral position. Then if it is desired that the apron shall be fed longitudinally along the lathe bed, lever 50 will be shifted to its uppermost position, whereupon the gear 52 will be swung into meshing engagement with gear 24 and a gear train will be set up as follows: Gear 25, meshing with rack 17 and fixed with relation to gear 24, will have a driving connection with gear 52 which meshes with gear 37 on tubular member 34. The gear 32 always meshes with the worm 31 on lead screw 15, but is normally in idling relation to tubular member 34. Thereupon, the hand piece 34 may be rotated upon the screw threaded outer end 39 of the shaft 38 to draw said shaft 38 outwardly. As the shaft 38 moves outwardly against the pressure of spring 47, the toggle members 46 are expanded, thereby expanding the cup segments 43 into firm frictional engagement with gear 32. The expanding movement of toggles 46 has both a longitudinal and a transverse component with respect to shaft 38, and thus serves to clamp the gear 32 solidly against the gear 37. It will be understood, of course, that the hand piece 40 bears against the outer end of tubular member 34, whereby the shaft 38 is solidly clamped with respect to said tubular member 34 by the hand piece 40 and the toggles 46. Also, the expanded condition of the toggle 46 and cup 43, locks the gear 32 with shaft 38. In this condition, the gear train is firmly clutched, and the rotation of lead screw 15 is transmitted through the gear train to the gear 25, whereby the apron is caused to move lengthwise along the lathe bed.

The parts are so proportioned that only a fractional turn of the hand piece 40 is required to effect the clutching operation. The clutching action is smooth and positive by virtue of the toggle and establishes a powerful compact drive. By virtue of the seating of the toggles 46 within the cup sections, the clutch is substantially free from wear, and the expanding action of the toggle plates is applied to substantially the entire extent of the inner faces of the pocket formed by enlarged bore of gear 32. The loose mounting of shaft 38 within the tubular member 34 accommodates an equalization of the pressure applied upon the expanding toggle members 46 and cups 43 as will be readily understood. Upon release of the hand piece 40, the spring 47 shifts the shaft 38 to the inner end of its travel at a position releasing the toggle members 46 and again effecting an idling relation between the gear 32 and the tubular member 34. By the use of this simple toggle mechanism, the force of the actuating screw 38 is greatly multiplied and produces a smooth operating device which is capable of transmitting great power, and which is absolutely free from slipping when in operation.

The construction is simple and the number of the parts is small, so that the clutch mechanism may be very readily manufactured and assembled, and is free from manufacturing troubles usually present in other types of friction clutches for apron power feeds. Additionally it will be seen that with this toggle construction, the device is free from sticking and will stop instantly when released. It will be understood in this connection that the notches 42 in the end of shaft 38 receiving the toggle members 46 will be of a dimension which will snugly receive the inner ends of the toggle members 46 and insure transmission of releasing motion thereto upon inward longitudinal movement of the shaft 38 under the influence of spring 47 when hand piece 40 has been released.

While only the gear train necessary to effect longitudinal movement of the apron has been above described, it will be understood that when the lever 50 is shifted to its lowermost position, the gear 52 will be swung into meshing engagement with the pinion (not shown) of gear 26 on shaft 27, to thereby establish a drive connection between the tubular member 34 and the pinion (not shown) on cross feed shaft 23 through gear 37, gear 52, pinion of gear 26 on shaft 27, gear 26, and pinion on shaft 23.

I claim:

1. The combination with a lathe apron having actuating gearing including a drive gear normally in idling relation to the remainder of said gearing, and a tubular member fixedly mounting one gear and normally journaling said drive gear, of a friction clutch comprising a longitudinally split cup fitting within said drive gear, an elongated shaft extending longitudinally freely through said tubular member, a pair of disk segments within said cup seating in notches in said shaft and extending at an angle to said shaft and to each other, and means for longitudinally shifting said shaft into locked relation with said tubular member, said longitudinal shaft movement urging said segments toward aligned relation to expand said cup and lock said idler gear in fixed relation to said shaft and tubular member.

2. In combination, an elongated tubular member, a gear journaled on said member and having a hollow portion projecting therefrom, a longitudinally split cup fitting in said hollow gear portion, a shaft extending through said tubular member and into said cup, said shaft having an abutment thereon, a pair of relatively angularly disposed toggle plates within said cup and engaging the inner periphery thereof, the inner edges of said toggle plates being seated against said abutment, and means for longitudinally shifting said shaft to expand said toggle and effect a tight frictional engagement between said cup and gear.

3. The combination with a lathe apron having an elongated tubular member journaled therein and including a gear portion, a gear journaled on said member and having a hollow portion projecting therefrom, of a clutch between said members comprising a shaft loosely extending through said tubular member and having an abutment thereon, a split cup within said hollow gear portion, relatively angularly disposed toggle plates engaging the inner periphery of the split cup and having edge engagement with said abutment, and means for longitudinally shifting said shaft to a position clamping said shaft fixedly in said tubular member and expanding said toggle to force said cup into tight frictional engagement with said gear.

4. The combination with a lathe apron having an elongated tubular member journaled therein and including a gear portion, a gear journaled on said member and having a hollow portion projecting therefrom, of means for locking said gear on said member comprising a shaft passing through said tubular member and having an abutment thereon adjacent one end, a multi-sectional annular member fitting within said hollow gear portion, relatively angularly disposed toggle elements seated against said abutment and bearing against said annular member, and a hand piece threaded on said shaft and adapted to bear against the end of said tubular member opposite said toggle, said hand piece being actuable to adjust the longitudinal position of said shaft.

5. The construction defined in claim 4, and a spring normally urging said shaft toward toggle releasing position.

6. The construction defined in claim 4, wherein said shaft has a loose fit in said tubular member to accommodate equalization of expanding action of said toggle elements.

7. The combination with a lathe apron having an elongated tubular member journaled therein and including a gear portion, a gear journaled on said member and having a hollow portion projecting therefrom, of a sectional member fitting in said hollow portion, a shaft extending through said tubular member, toggle means acting on said sectional member and actuable by said shaft, and adjustable means for longitudinally shifting said shaft to actuate said toggle means for frictionally locking said sectional member with said gear and cooperating with said toggle means for clamping said shaft fixed in said tubular member.

8. The construction defined in claim 7, wherein said sectional member is annular and said toggle means comprise segments of a circular plate.

9. The combination with a lathe apron housing a gear train including a gear fixed on a member journaled in said apron, and a gear journaled on said member, said last named gear having a portion with an enlarged bore, an adjustable member shiftable axially of said bore, toggle elements actuated by said adjustable member and fitting in said gear bore, and actuating means for said adjustable member positioned exteriorly of said apron, said actuating means cooperating with said toggle means for clamping said parts in stationary relation with said gear fixed relative to said first named member.

10. A friction clutch comprising a drive gear, a tubular member journaling said drive gear and fixedly mounting a driven gear, said drive gear having a projecting hollow portion, a shaft loose in said tubular member, toggle elements carried by one end of said shaft and seating in said hollow gear portion, and means adjustable on the opposite end of said shaft and bearing against the adjacent end of said tubular member for longitudinally shifting said shaft in said tubular member in toggle expanding direction.

11. The construction defined in claim 10, and a spring normally urging said shaft longitudinally in toggle releasing direction.

12. The construction defined in claim 10, and an expansible sectional annular member seating in said hollow gear portion and engaged by said toggle elements.

13. The construction defined in claim 10 wherein said drive gear bears against said driven gear, and a sectional cup shaped member seating in said hollow gear portion and engaged by said toggle elements, whereby actuation of said toggle elements expands said cup member and applies axial pressure thereon to press said drive gear against said driven gear.

14. A friction clutch comprising a driven gear fixed on a rotatable member, a hollow drive gear having a hub journaled on said member and bearing against said driven gear, friction means fitting in said hollow gear and including a toggle, and means for actuating said toggle to expand said friction means into frictional engagement with said drive gear, said toggle applying a combined longitudinal and radial force to said drive gear for locking the same in fixed relation to said driven gear.

GEORGE L. GARVIN.